US010305836B2

(12) United States Patent
Tonegawa

(10) Patent No.: US 10,305,836 B2
(45) Date of Patent: *May 28, 2019

(54) COMMUNICATION APPARATUS, INFORMATION PROCESSING METHOD, PROGRAM, AND STORAGE MEDIUM

(71) Applicant: CANON KABUSHIKI KAISHA, Tokyo (JP)

(72) Inventor: Nobuyuki Tonegawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 905 days.

This patent is subject to a terminal disclaimer.

(21) Appl. No.: 14/073,563

(22) Filed: Nov. 6, 2013

(65) Prior Publication Data

US 2014/0067978 A1    Mar. 6, 2014

Related U.S. Application Data

(63) Continuation of application No. 10/585,090, filed as application No. PCT/JP2005/014154 on Jul. 27, 2005, now Pat. No. 8,612,521.

(30) Foreign Application Priority Data

Jul. 30, 2004 (JP) .................................. 2004-224581

(51) Int. Cl.
*G06F 15/16* (2006.01)
*H04L 12/58* (2006.01)
(Continued)

(52) U.S. Cl.
CPC .......... *H04L 51/18* (2013.01); *G06Q 10/107* (2013.01); *H04L 51/066* (2013.01);
(Continued)

(58) Field of Classification Search
CPC ...................................................... H04L 51/18
See application file for complete search history.

(56) References Cited

U.S. PATENT DOCUMENTS 5,265,033 A    11/1993    Vajk
6,243,681 B1    6/2001    Guji
(Continued)

FOREIGN PATENT DOCUMENTS

JP    10-177623    6/1998
JP    11-184778    7/1999
(Continued)

OTHER PUBLICATIONS

Yoshijisa Ohguro, "Automatic Language Identification in Printed Document Images", Ricoh Technical Report, Japan, Ricoh Company Ltd., No. 29, Dec. 1, 2003.
(Continued)

*Primary Examiner* — Hua Fan
(74) *Attorney, Agent, or Firm* — Venable LLP

(57) ABSTRACT

This invention has as its object to avoid occurrence of garble even when an e-mail message to be created includes text information described in character codes of different kinds of language. To achieve this object, a communication apparatus according to this invention includes an input unit which inputs image information, a recognition unit which extracts text information included in the image information input by the input unit, and recognizing a type of character code of the extracted text information, an embedding unit which embeds the extracted text information in a text of e-mail using character codes of the type recognized by the recognition unit, and describing the recognized type (510, 516) of character code and an identifier (509, 515, 526) indicating a description range of the extracted text informa-
(Continued)

tion in the text of e-mail, and a sending unit which sends e-mail data embedded by the embedding unit.

13 Claims, 9 Drawing Sheets

(51) Int. Cl.
*G06Q 10/10* (2012.01)
*H04N 1/00* (2006.01)

(52) U.S. Cl.
CPC ..... *H04N 1/00326* (2013.01); *H04N 1/00331* (2013.01); *H04N 1/00209* (2013.01); *H04N 2201/0068* (2013.01)

(56) References Cited

U.S. PATENT DOCUMENTS

| | | | |
|---|---|---|---|
| 2002/0193986 A1* | 12/2002 | Schirris | G06F 17/2872 704/8 |
| 2004/0064515 A1* | 4/2004 | Hockey | G06F 21/562 709/206 |
| 2005/0071500 A1 | 3/2005 | Tonegawa | |
| 2005/0144243 A1* | 6/2005 | Cheng | G06F 17/2247 709/206 |
| 2005/0225809 A1 | 10/2005 | Tonegawa | |
| 2006/0192990 A1 | 8/2006 | Tonegawa | |
| 2006/0200529 A1 | 9/2006 | Tonegawa | |
| 2006/0212527 A1 | 9/2006 | Tonegawa | |
| 2006/0212528 A1 | 9/2006 | Tonegawa | |

FOREIGN PATENT DOCUMENTS

| | | |
|---|---|---|
| JP | 11-306105 | 11/1999 |
| JP | 2001-217876 | 8/2001 |
| JP | 2002-232806 | 8/2002 |
| JP | 2003-242086 | 8/2003 |
| JP | 2004-192528 | 7/2004 |
| JP | 2004-200937 | 7/2004 |

OTHER PUBLICATIONS

Masaharu Ozaki, "Palace: A Multilingual Document Recognition System", Fuji Xerox Technical Report, Japan, Fuji Xerox Co., Ltd., No. 10, Dec. 25, 1995.
Japanese Office Action dated May 28, 2010 issued during prosecution of related Japanese application No. 2004-224581.
Yu Inamura, "E-mail by multimedia 2", bit, vol. 26, No. 8, Japan, Kyoritsu Shuppan Co., Ltd., Aug. 1, 1994. (whole English translation).
Japanese Office Action dated Dec. 13, 2010 issued during prosecution of related Japanese application No. 2004-224581.
Feng Guangming,"Chinese Writer V4", PC Wave, vol. 6, No. 11, Oct. 1, 1998, pp. 146-152.
Shinya Yamaguchi, "The foundation of foreign language and multilingual processing in Windows and PC", PC Wave, vol. 4, No. 12, Nov. 1, 1996, pp. 118-122.
English translation of submitted prior art, Feng Guangming (Koumei Hyo), "Chinese Writer V4, standard multilingual word processor with a further improved level completion", PC wave, vol. 6, No. 11, Oct. 1, 1998, p. 146-152.
English translation of submitted prior art, JP 10-177623 A. Ayako, "Document recognizer and language processor", Jun. 30, 1998 (Jun. 30, 1998), all pages.

* cited by examiner

FIG. 6

```
500 ── X-Priority: 1 (Highest)
501 ── Date: Wed, 31 Dec 2003 17:17:14 +0900
502 ── From: <ifax@copy3.xyz.co.jp>
503 ── Subject: =?ISO-2022-JP?B?GyRCO3FOQUF3SVUbKEI=?=
504 ── To: =?ISO-2022-JP?B?GyRCIUozdCFLGyhCQUJD?= <ifax@abc.co.kr>
505 ── Message-Id: <20031231133647.TxNo.0580.01@copy3.xyz.co.jp>
506 ── Mime-Version: 1.0
507 ── Content-Type: multipart / mixed; boundary="boundary"
508 ──
509 ── --boundary
510 ── Content-Type: text / plain; charset="ISO-2022-JP"
511 ── Content-Transfer-Encoding: 7bit
512 ──
513 ── ·$B4Z9q81%^%K%e%"%k$N·(BOCR·$B7k2L$rAw$j$^$9!#·(B
514 ──
515 ── --boundary
516 ── Content-Type: text / plain: charset="ISO-2022-KR";
517 ──     name="?ISO-2022-KR?B?vK23-+bimw7e6zsfYurizwLTP=?=.txt"
517 ── Content-Transfer-Encording: 7bit
518 ── Content-Disposition: attachment:
519 ──     filename="?ISO-2022-KR?B?vK23+bimw7e6zsfYurizwLTP=?=.txt"
520 ──
521 ── ·$)C<-7y8&· C7:NGX· :83@404Y·.
522 ── ···
523 ── ···
524 ── ···
525 ──
526 ── --boundary--
```

FIG. 9

```
800 ~ X-Priority: 1 (Highest)
801 ~ Date: Wed, 31 Dec 2003 17:17:14 +0900
802 ~ From: <ifax@copy1.xyz.co.jp>
803 ~ Subject: URL Message
804 ~ To: <yamada@xyz.co.jp>
805 ~ Message-Id: <20031231133647.TxNo.0580.01@copy1.xyz.co.jp>
806 ~ Mime-Version: 1.0
807 ~ Content-Type: multipart / mixed; boundary="boundary"
808 ~
809 ~ --boundary
810 ~ Content-Type: text / plain; charset="ISO-2022-JP"
811 ~ Content-Transfer-Encoding: 7bit
812 ~
813 ~ ·$BAw?.<T!'·(Bifax@abc.co.kr
814 ~ ·$BAw?.FIIU!'·(BWed, 31 Dec 2003 17:10:54 +0900
815 ~ ·$B7oL>!'·(BTo BOX1
816 ~
817 ~ Box·$BHV9f#1$K%G!<%?$r3JG<$7$^$7$?!#·(B
818 ~ ·$BOJ2<$N·(BURL·$B$G2hAI$, ;2>H$G$-$^$9!#·(B
819 ~ http://copy3.canon.co.jp/frame.cgi?FuncType=BOX&Dummy=1077503290427
820 ~
821 ~ --boundary
822 ~ Content-Type: text/plain; charset="ISO-2022-KR"
823 ~ Content-Transfer-Encoding: 7bit
824 ~
825 ~ ·$)C<-7y8&·C7:NGX·: 83@404Y·.
826 ~
827 ~ --boundary--
```

COMMUNICATION APPARATUS, INFORMATION PROCESSING METHOD, PROGRAM, AND STORAGE MEDIUM

This application is a continuation of application Ser. No. 10/585,090, filed Jun. 30, 2006, (allowed), which is a § 371 of International Application No. PCT/JP2005/014154, filed Jul. 27, 2005, which claims priority to Japanese Application No. JP 2004-224581, filed Jul. 30, 2004.

TECHNICAL FIELD

The present invention relates to an information processing technique for generating e-mail data.

BACKGROUND ART

In recent years, along with popularization of computers and prevalence of networked environments of information, e-mail messages that exchange text information via networks have prevailed.

E-mail allows to attach files of various formats as "attached files" to a "text of e-mail" that includes mail text as text information, and a mail header that describes various kinds of control information. For example, by exploiting Internet FAX (to be abbreviated as "IFAX" hereinafter), images can be exchanged by attaching a TIFF (Tag Image File Format) format file.

More specifically, a sender converts an image, which is scanned by a scanner, into a TIFF format, and sends it as an attached file of e-mail. A receiver receives the e-mail, and reproduces and prints the attached TIFF file, thus implementing exchange of the image between the sender and receiver.

Recently, a technique for, upon sending a document which includes handwritten text and an image together via e-mail, not only sending an image scanned by a scanner as an attached file, but also extracting text information by applying an OCR to the scanned image, and embedding the extracted text information in a text of e-mail when it is sent has been proposed (e.g., see Japanese Patent Laid-Open No. 11-306105).

Furthermore, the IFAX is literally used in the Internet environments, and is increasingly used in international environments. Hence, character codes do not match between a sender and receiver, and when received e-mail is displayed, garble often occurs in the text of e-mail. In order to solve such problem, a technique for switching a character code and font on the basis of a character string at the end of an e-mail address has been proposed (e.g., see Japanese Patent Laid-Open No. 11-184778).

However, as described in Japanese Patent Laid-Open No. 11-306105, when e-mail is created by embedding text information extracted by the OCR into the text of e-mail, some documents scanned by the scanner may often be garbled. For example, when e-mail is created by inputting Japanese text information to a text of e-mail, and embedding Korean text information, which is extracted by scanning a document written in Korean using the scanner and applying the OCR, into the text of e-mail written in Japanese (i.e., when the single text of e-mail includes text information described in character codes of different kinds of language), the receiver side that received that e-mail displays garbled Korean text information since the character code does not match.

That is, when e-mail is normally created by inputting Japanese text information to a text of e-mail, and embedding Japanese text information, which is extracted by scanning a document written in Japanese using the scanner and applying the OCR, into the text of e-mail, since the identical character code is used, no problem of garble is posed. However, when text information used in documents becomes diversified based on pervasion of current globalization, and languages such as Chinese, Korean, and the like are increasingly used daily, such problem of garble becomes obvious.

On the other hand, the problem of garble has been discussed in, e.g., Japanese Patent Laid-Open No. 11-184778, this reference targets at a case wherein character codes of the sender and receiver do not match, and cannot be applied to a case wherein the text of e-mail includes text information of different character codes.

Furthermore, the problem of garble may be caused not only by the process on the sender side but also that on the receiver side. For example, a system which stores a received e-mail message in a mail box in a mail server, and in which a communication apparatus creates a notification e-mail message using text information of a text of the received e-mail message, and text information used to notify the receiver that the e-mail message is stored in the mail box (text information appended by the communication apparatus), and sends the created notification e-mail message to the receiver will be exemplified below.

In such system, when the communication apparatus creates a notification e-mail message, and the kind of language of a character code of text information included in the text of the received e-mail message is different from that of a character code of text information (which is used to notify the receiver that the e-mail message is stored in the mail box) to be appended by the communication apparatus, the notification e-mail message to be created includes text information described in text codes of different kinds of language, and the receiver that receives the created notification e-mail message displays garbled contents due to mismatch of the character codes.

DISCLOSURE OF INVENTION

The present invention has been made in consideration of the above situation, and has as its object to avoid occurrence of garble even when an e-mail message to be created includes text information described in character codes of different kinds of language.

More specifically, it is the first object of the present invention to provide a communication apparatus which can create and send e-mail by extracting text information by applying an OCR to an image, which is scanned using an image input device such as a scanner or the like, and embedding the extracted text information into a text of e-mail, wherein even when the kind of language of a character code of the extracted text information is different from that of a character code of text information which is input to the text of e-mail, the communication apparatus can create the e-mail so as to avoid garbled contents from being displayed on the receiver side that receives the e-mail.

It is the second object of the present invention to provide a system which stores a received e-mail message, and in which a communication apparatus creates a notification e-mail message using text information of a text of the received e-mail message, and text information used to notify the receiver that the e-mail message is stored in the mail box, and sends the created notification e-mail message to the receiver, wherein even when the kind of language of a character code of text information included in the text of the received e-mail message is different from that of a character code of text information to be appended by the communication apparatus, the system creates the notification e-mail message so as to avoid garbled contents from being displayed on the receiver side that receives the notification e-mail message.

In order to achieve the above objects, a communication apparatus according to the present invention comprises the following arrangement. That is, a communication apparatus, comprises:

input means for inputting image information;

recognition means for extracting text information included in the image information input by the input means, and recognizing a type of character code of the extracted text information;

embedding means for embedding the extracted text information in a text of e-mail using character codes of the type recognized by the recognition means, and describing the recognized type of character code and an identifier indicating a description range of the extracted text information in the text of e-mail; and sending means for sending e-mail data embedded by the embedding means.

According to the present invention, even when an e-mail message to be created includes text information described in character codes of different kinds of language, occurrence of garble can be avoided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The features and advantages of the present invention will be sufficiently understood by referring to the following detailed description of the preferred embodiments taken in conjunction with the accompanying drawings.

FIG. 6 shows an example of e-mail data to be sent from a communication apparatus according to the first embodiment of the present invention;

FIG. 9 shows an example of notification e-mail data to be transferred by a communication apparatus according to the second embodiment of the present invention.

BEST MODE FOR CARRYING OUT THE INVENTION

An overview of respective embodiments of the present invention will be explained first. In a conventional communication apparatus, when text information to be input to a text of e-mail is, e.g., Japanese, and text information extracted by applying an OCR to an image scanned by a scanner is Korean, an e-mail message is created by directly embedding the extracted text information in the text of e-mail input in Japanese. For this reason, a single e-mail message includes text information described in character codes of different kinds of language. As a result, the receiver that receives the created e-mail message cannot recognize that the text information of the text of e-mail include a plurality of different character codes, and displays it using one type of character code, thus causing garble.

By contrast, in a communication apparatus according to the first embodiment, upon embedding text information extracted by applying an OCR into a text of e-mail, the type of character code of the extracted text information is detected (on the basis of an operator's instruction or automatically). The detected type of character code and an identifier that indicates a description range of the extracted text information are described in the text of e-mail to clearly specify them to the receiver side, thus avoiding occurrence of garble.

On the other hand, in a system which stores a received e-mail message in a mail box, and in which a communication apparatus creates a notification e-mail message using text information of a text of the received e-mail message, and text information used to notify the receiver that the e-mail message is stored in the mail box, and sends the created notification e-mail message to the receiver, even when the type of character code of text information included in the text of the received e-mail message is different from that of text information to be appended by the communication apparatus, the conventional communication apparatus creates a notification e-mail message using text information described in character codes of different kinds of language in the single text of e-mail. For this reason, the receiver that receives the created notification e-mail message cannot recognize that the text information of the text of e-mail includes a plurality of different character codes, and displays it using one type of character code, thus causing garble.

By contrast, in a communication apparatus according to the second embodiment, upon describing text information of the text of the received e-mail massage in the text of the notification e-mail message, the type of character code of the text information, and identifier that indicates a description range of that text information are described to clearly specify them to the receiver side, thus avoiding occurrence of garble.

Preferred embodiments of the present invention will be described in detail hereinafter with reference to the accompanying drawings as needed.

First Embodiment

Figure 1:
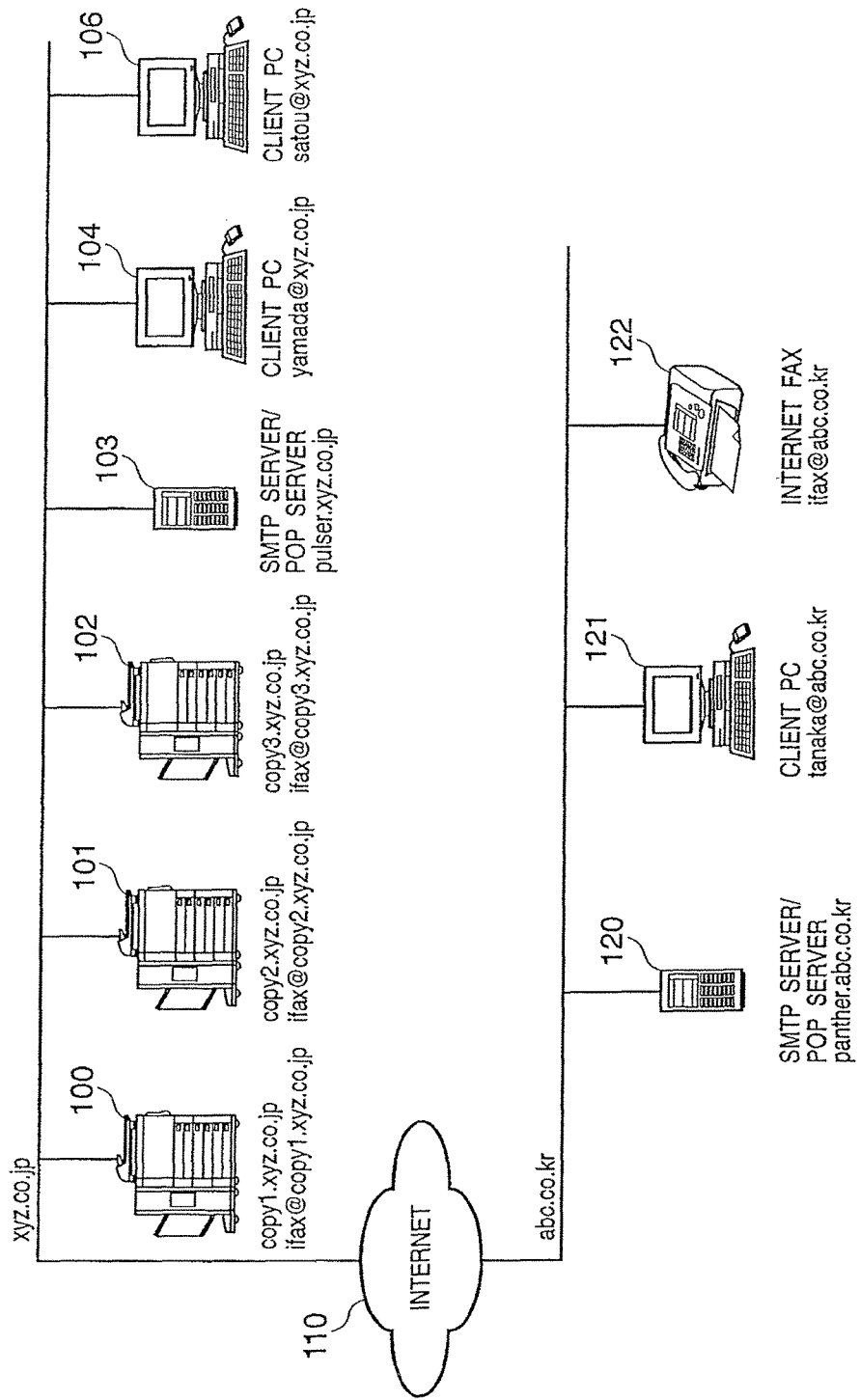
FIG. 1 is a block diagram showing the connection arrangement of a network which comprises a communication apparatus according to an embodiment of the present invention.

FIG. 1 is a block diagram showing the connection arrangement of a network which comprises a communication apparatus according to the first embodiment of the present invention.

Referring to FIG. 1, reference numerals 100 to 102 denote MFPs (Multi Function Peripherals) which are multi-function copying machines, each of which incorporates a scanner, printer, and the like, and has a copy function, a FAX sending/receiving function, a printer function of printing data created on a computer, and the like.

The MFPs 100 to 102 are connected to a network (domain name: xyz.co.jp), and are connected to a plurality of computers and network devices including an SMTP server/POP server 103, client PCs 104 and 106, and the like.

This network is also connected to the Internet 110 which spreads globally. A network (domain name: abc.co.kr) in Korea is also connected to the Internet 110. An SMTP server/POP server 120, client PC 121, Internet FAX 122, and the like are further connected to this network.

The MFP 100 is assigned with a HOST name copy1.xyz.co.jp and an e-mail address ifax@copy1.xyz.co.jp of that device. The MFP 101 is assigned with a HOST name copy2.xyz.co.jp and an e-mail address ifax@copy2.xyz.co.jp of that device. Furthermore, the MFP 102 is assigned with a HOST name copy3.xyz.co.jp and an e-mail address ifax@copy3.xyz.co.jp of that device.

The client PC 104 is installed with general-purpose e-mail software, and is assigned with an e-mail address yamada@xyz.co.jp. Likewise, the client PC 106 is assigned with an e-mail address satou@xyz.co.jp. The SMTP server/POP server 103 has functions of both the SMTP and POP servers, and the SMTP server/POP server 120 also has the same functions.

When an e-mail message is to be sent from the client PC 104 to tanaka@abc.co.kr, e-mail data created by the e-mail software on the client PC 104 is delivered to the SMTP server 103 using an SMTP (Simple Mail Transfer Protocol) protocol, is delivered from the SMTP server 103 to the POP server 120 using the SMTP protocol via the Internet 110, and is stored in a mail box of tanaka@abc.co.kr in the POP server 120.

The client PC 121 is also installed with general-purpose e-mail software, which monitors from the client PC 121 at given intervals using a POP3 (Post Office Protocol-Version 3) protocol, if e-mail messages have reached the mail box of tanaka@abc.co.kr in the POP server 120. If e-mail messages have reached the POP server 120, the e-mail software receives the e-mail data.

When an e-mail message is to be sent from tanaka@abc.co.kr of the client PC 121 to yamada@xyz.co.jp of the client PC 104, the reverse route is followed. That is, e-mail data created by the general-purpose e-mail software on the client PC 121 is relayed by the SMTP server 120, is then sent to the POP server 103, and is stored in a mail box of yamada@xyz.co.jp in the POP server 103.

The client PC 104 operates to acquire the e-mail data which is delivered using the POP3 protocol from the mail box of yamada@xyz.co.jp.

Each of the MFPs 100 to 102 has an Email sending mode based on the premise that images received by the FAX and IFAX reception functions and monochrome/color images scanned by a scanner are sent to general e-mail addresses, and an IFAX sending mode based on the premise that such images are sent to an apparatus complying with the IFAX standard.

Transmission/Reception Performs the Same Operations as That of the Client PCs 104 and 121 using SMTP and POP3.

In the Email sending mode, when a color image is scanned by a scanner, an image of a JPEG format or PDF (Portable Document Format) file is sent as an attached file. Also, when a monochrome image is scanned, a TIFF or PDF image can be sent as an attached file. When an e-mail message with such attached file is sent to the e-mail address yamada@xyz.co.jp, the client PC 104 receives that e-mail message using the POP3 protocol, and can display an image using a general-purpose image viewer.

In the IFAX sending mode, an image scanned by the scanner is sent to the IFAX MFPs 100 to 102 or the Internet FAX 122 as a TIFF image complying with RFC2301 using the SMTP and POP3 protocols.

<Arrangement of MFP>

Figure 2:
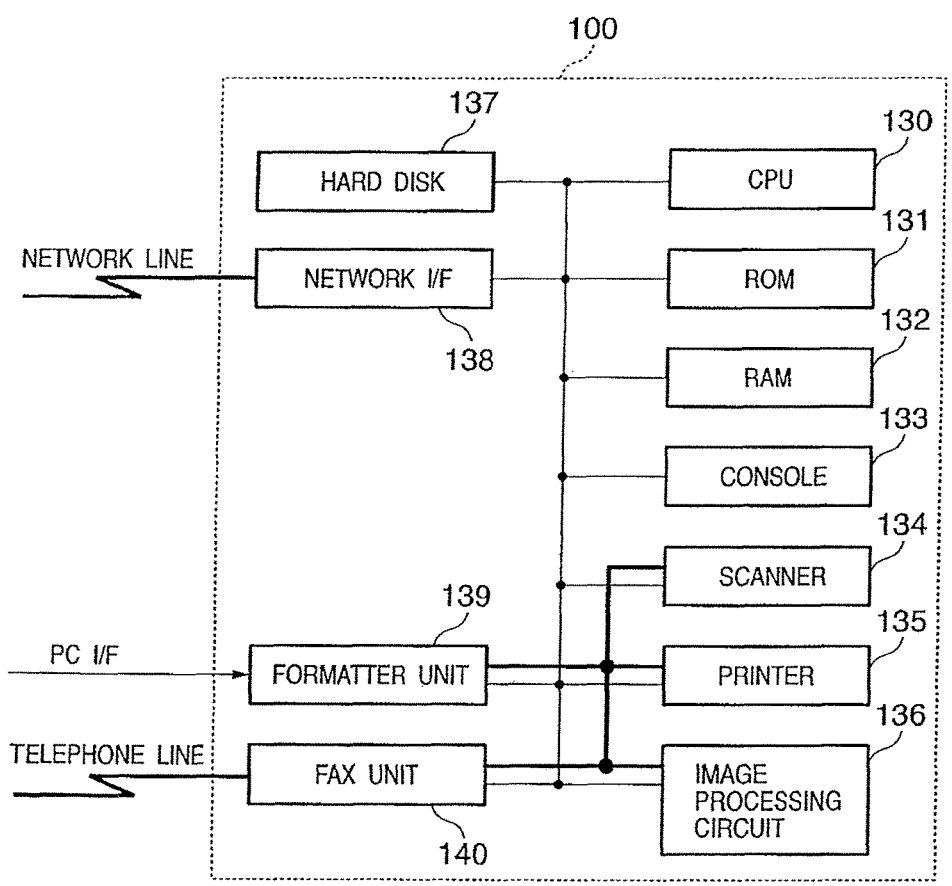
FIG. 2 is a block diagram showing the system arrangement of the communication apparatus according to the embodiment of the present invention.

FIG. 2 shows the arrangement of the MFP 100. A CPU 130 is a control circuit which controls the overall system using programs stored in a ROM 131 and a memory area of a RAM 132.

A console 133 includes an LCD display panel, and hard keys such as a start key, ten-keys, and the like. The console 133 has the following function. That is, the console 133 displays software buttons on the LCD display panel, and smoothly executes user's operations when the user touches one of these buttons.

A scanner 134 is a device for photoelectrically converting a document image into electrical image data. More specifically, the scanner 134 feeds a document from an automatic document feeder onto a platen glass. When the document reaches the platen glass, a lamp is turned on, and a scanner begins to move, and exposes and scans the document. Light reflected by the document is guided to a CCD image sensor via mirrors and lenses, and is converted into an electrical signal, which is converted into digital data by an A/D converter. Upon completion of the document scan operation, the document on the platen glass is exhausted.

A printer unit 135 is a device which prints electrical image data on a print sheet. More specifically, a laser emission unit emits a laser beam according to the electrical image data, and a photosensitive drum is irradiated with the laser beam to form a latent image according to the laser beam on the photosensitive drum. A developer applies toner to the latent image on the photosensitive drum, and a print sheet is fed from a paper cassette at a timing synchronized with the start of irradiation of the laser beam, thus transferring the toner attached to the photosensitive drum to the print sheet. The print sheet on which the toner image is formed is conveyed to a fixing unit, and the toner image is fixed to the print sheet by heat and pressure of the fixing unit. The print sheet that has left the fixing unit is exhausted by exhaust rollers. The exhausted print sheet is stored in each bin by a sorter, thus sorting print sheets.

An image processing circuit 136 comprises a large-capacity image memory, image rotation circuit, resolution zoom circuit, encoding/decoding circuit (MH, MR, MMR, JBIG, JPEG, and the like), and the like, and can execute various image processes such as shading, trimming, masking, and the like.

A hard disk 137 is a large-capacity storage medium connected via an I/F such as SCSI, USB, or the like. The present invention is not limited to the hard disk, and recording media such as MO and the like may be used.

A network I/F 138 has a function of implementing a network data link required to connect a network such as Ethernet (10BASE-T, 100BASE-T), Token ring, or the like.

A formatter unit 139 comprises a PC I/F circuit such as a parallel interface complying with IEEE1284, USB, or the like. The formatter unit 139 has a rendering function for generating image data on the basis of PDL (Page Description Language) data, which is received from a personal computer via the PC I/F circuit or the network I/F circuit. The generated image data undergoes image processes by the image processing circuit 136, and is printed by the printer 135.

A FAX unit 140 is a FAX I/F circuit which is connected to a telephone line, and comprises circuits such as an NCU (Network Control Unit), MODEM (MOdulator/DEModulator), and the like. Image data scanned by the scanner 134 undergoes image processes by the image processing circuit 136, and the FAX unit 140 sends the processed image to another FAX via the telephone line. The FAX unit 140 receives data sent from another FAX. The received image data undergoes image processes by the image processing circuit 136, and is printed by the printer 135.

The scanner 134, printer 135, image processing circuit 136, formatter unit 139, and FAX unit 140 are connected via a high-speed video bus independent of a CPU bus from the CPU 130, and can transfer image data at a high speed.

Image data scanned by the scanner 134 undergoes image processes by the image processing circuit 136, and is printed by the printer 135, thus implementing the copy function.

The MFP 100 also has a Send function of sending image data scanned by the scanner 134 onto the network from the network I/F after the image data undergoes image processes by the image processing circuit 136, or an IFAX function of generating an image complying with RFC2301 by the image processing circuit 136, and exchanging the data using an e-mail protocol.

<Network Program Configuration of MFP>

Figure 3:
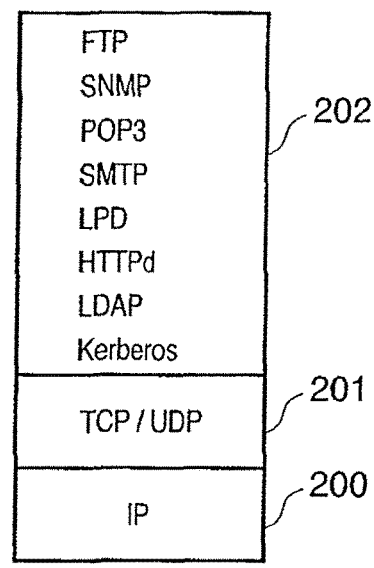
FIG. 3 shows the configuration of programs of the communication apparatus according to the embodiment of the present invention.

FIG. 3 is a view for explaining the configuration of network programs of the MFP 100. The network programs are roughly classified into three layers, i.e., an IP (Internet Protocol) 200, TCP (Transmission Control Protocol)/UDP (User Datagram Protocol) 201, and programs (protocols) 202 of an application layer.

The IP 200 is a protocol layer of the Internet, which provides a service for delivering a message from a source host to a destination host in collaboration with relay nodes such as routers and the like. The IP 200 implements a routing function of managing an address of a source which sends data, and an address of a destination that receives data, and managing a delivery route of data in the network to the destination host in accordance with the address information.

The TCP/UDP 201 is a transport layer which provides a service for delivering a message from a source application process to a receiving application process. The TCP is a connection type service, and guarantees high communication reliability, but the UDP is a connection-less service, and does not guarantee any reliability.

The protocols 202 of the application layer specify a plurality of protocols, which include FTP (File Transfer Protocol) as a file transfer service, SNMP as a network management protocol, LPD as a printer server protocol, HTTPd as a protocol of a WWW (World Wide Web) server, an e-mail exchange protocol SMTP (Simple Mail Transfer Protocol), a mail download protocol POP3 (Post Office Protocol-Version3), LDAP as a protocol required to access a directory database that manages an e-mail address of the user and the like, and so forth. Also, a kerberos authentication program specified by RFC1510 is installed.

<Setting Window Upon Sending E-mail in MFP>

Figure 4:
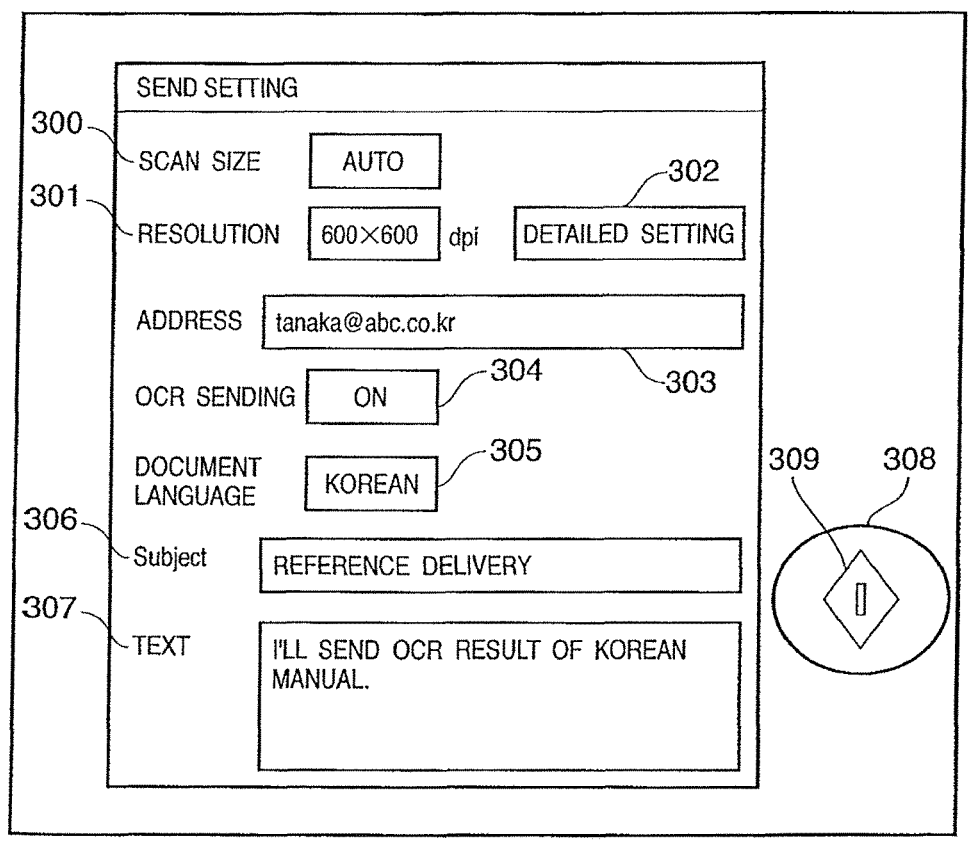
FIG. 4 is a view for explaining a send setting function of the communication apparatus.

FIG. 4 shows an example of a send setting window which is displayed on the console 133 when the MFP 100 sends image data scanned by the scanner 134 as an e-mail message.

The user can designate a document size to be scanned by the scanner 134 using a scan size input field 300. The user can designate a paper size such as A3, A4, A5, B4, B5, 11×17, LTR, STMT, or the like, and its direction. In FIG. 4, since "auto" is set, a value sensed by a document sensor included in the scanner 134 is loaded.

The user can designate a resolution when the scanner 134 scans an image using a resolution input field 301. The user can designate a resolution from 200×100, 200×200, 200× 400, 300×300, 400×400 and 600×600 dpi. A default value is 200×200. In FIG. 4, 600×600 dpi are set. Upon pressing a detail setting button 302, detailed scanning operations such as density setting, document type designation, two-sided scan, continuous page scan designation, image quality adjustment, and the like.

Upon selecting an e-mail destination address input field 303, the user can select addresses registered in an address book. Note that the maximum number of addresses that can be registered in the sending address input field 303 is 256, and addresses more than this value cannot be input.

An OCR sending button 304 is used to select whether an OCR is applied to an image scanned by the scanner 134 to extract character code data, and is enabled for a sending address of e-mail. If "ON" is selected for this button 304, a text region is extracted from the scanned image using a block selection function, and the OCR is applied to the text region to extract text information.

The extracted text information is embedded in a text of e-mail, and is sent to an address described in the e-mail destination address input field 303. Also, a PDF file may be created using the scanned image, and text information extracted by the OCR, and may be attached to e-mail, which can be sent to an address described in the e-mail destination address input field 303.

The user sets a language of a document described in an image to be scanned by the scanner 134 using a Document language input field 305, and can set it from OCR dictionaries of the MFP 100. With this setting, the MFP 100 can recognize the type of character code of text information to be extracted by the OCR. This setting is not indispensable, and a dictionary may be automatically selected from characters which match during the OCR process.

A Subject input field 306 and text input field 307 are respectively a subject and mail text in e-mail to be sent. Upon selecting each of these input fields, a software keyboard is displayed, and a character string can be input. Note that this software keyboard varies depending on the places of destination. For example, in case of an MFP for Japan, Japanese can be input using Kanji characters by this keyboard and a Japanese FEP (Front End Processor). Likewise, in case of an MFP for Korea, Korean can be input using a keyboard for Korea, and Korean FEP. Also, in case of an MFP for Europe, German, French, and the like can be input using a keyboard for Europe. Note that a language used in the Subject input field 306 and text input field 307 need not always be the same as the Document language input field 305.

A start key 308 is a hard key which is set beside the console 133. Upon pressing this key, the scanner 134 can be driven. Blue and red LEDs 309 are mounted at the center of the start key 308. When none of addresses of the destination address input field 303 are designated, the red LED 309 is turned on to inform the user that the scanner 134 cannot be driven even when he or she presses the start key 308. If at least one address is designated in the destination address input field 303, the blue LED is turned on to inform the user that the scanner 134 is ready to drive.

<Flow of Processes in Email Sending Mode of MFP>

Figure 5:
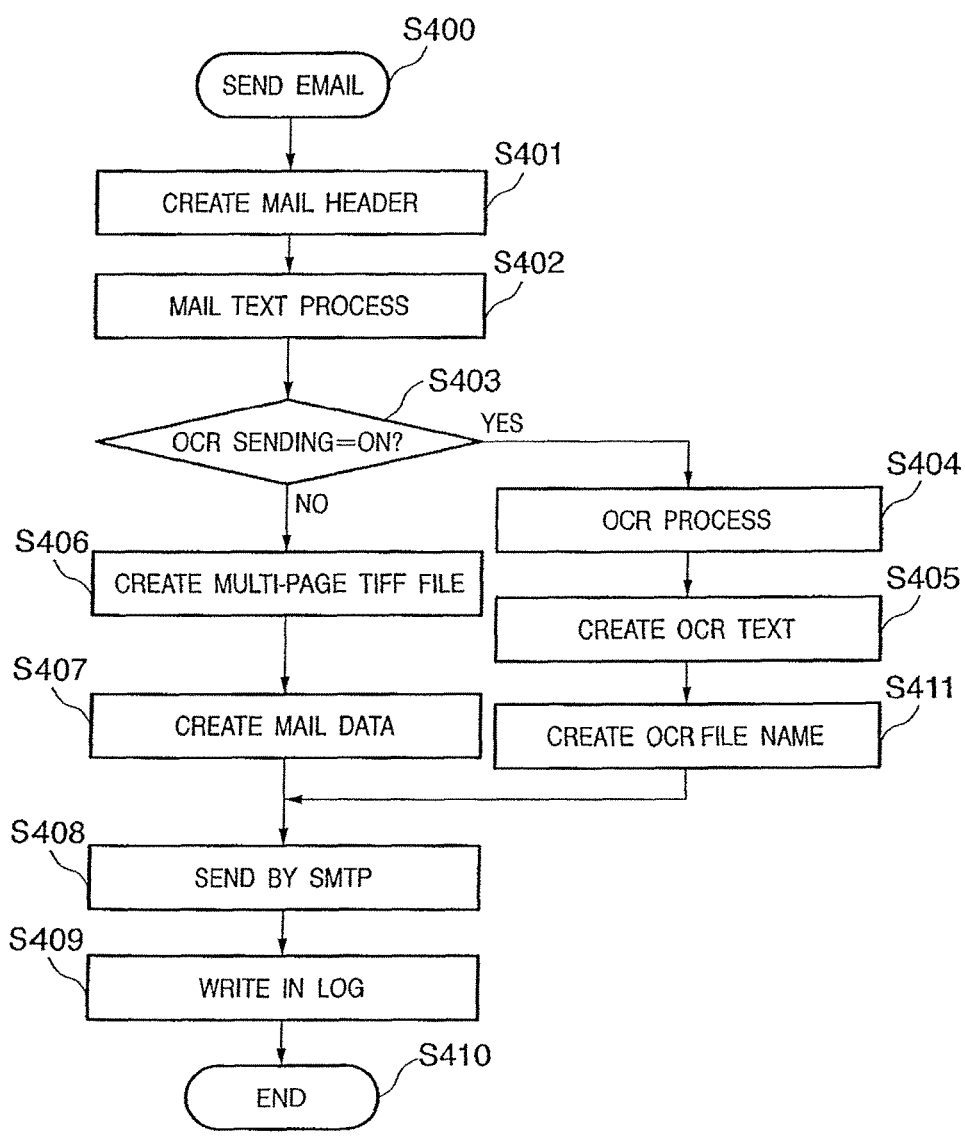
FIG. 5 is a flowchart showing the flow of an Email sending process of the communication apparatus.

FIG. 5 is a flowchart showing the flow of the processes in the Email sending mode which performs a sending operation, to an e-mail destination address, of e-mail data which is obtained by driving the scanner 134 by the start key 308 in the MFP 100 to scan a document set on the feeder, and is encoded using the MIME specification as follows.

After a document set on the feeder is scanned, the control enters an Email sending flow in step S400. In step S401, a mail header (500 to 507) in FIG. 6 is created. In FIG. 6, an X-priority field (500) indicates that the e-mail priority is highest. A Date field (501) is created based on time data of a timepiece set in the MFP 100, and a From field (502) is created based on an e-mail address of the device set in the MFP 100. A Subject field (503) includes data of an encoded-word format which is obtained by converting a character string of SJIS codes, which is input to the Subject input field 306 into JIS codes, and encoding the converted character string by BASE64. A Message-Id field (505) includes a sending time, sending reception number, domain name, and the like, and serves as a unique identifier to each e-mail data. A Content-Type field (507) indicates that an e-mail message includes a plurality of parts, each of which is delimited by a character string "boundary".

Referring back to FIG. 5, in step S402, mail text input in the text input field 307 is created. More specifically, the text corresponds to fields 509 to 514 in FIG. 6. Note that 509 and 515 indicate data delimiters.

Since the MFP 100 (copy1.xyz.co.jp) is that for Japan, the software keyboard and FEP are Japanese, and the mail text is created in Japanese. Hence, a field 510 describes that an e-mail part is text information, and its character set includes JIS codes of ISO-2022-JP, and a field 511 describes that 7-bit data is stored. A field 513 includes a character string obtained by converting SJIS codes "I'll send OCR result of Korean manual." in the text input field 307 into JIS codes.

In step S403, the value set for the OCR sending button 304 is compared. If "ON" is set, an OCR process is executed to apply the OCR to an image scanned by the scanner 134 so as to extract text information in step S404. In the OCR process in step S404, text information is extracted while comparing Font data corresponding to the language set in the Document language input field 305 and characters written in the image scanned by the scanner 134. If the characters written in the image do not match the language set in the Document language input field 305, they may be compared to Font data of other languages, thus improving the OCR extraction rate.

In step S405, the text information extracted in step S404 is embedded in the e-mail data like fields 521 to 524. A field 516 indicates that an e-mail part is obtained by encoding Korean text information using a character set of ISO-2022-KR. A field 517 includes the encoding result using ISO-2022-KR, and indicates that 7-bit data is stored. Fields 521 to 524 include character codes obtained by encoding, using ISO-2022-KR, text information which is extracted by applying the OCR to the image scanned by the scanner. A field 526 indicates the last delimiter of the embedded e-mail data.

In an OCR file name creation process in step S411, the OCR is applied to the first page of an image scanned by the scanner 134, and first text information obtained by the OCR process is used as a file name of this file. As indicated by fields 517 and 519, the obtained file name is described by encoding it using ISO-2022-KR, and appending an extension ".txt" to the result. Note that text information used as a file name is a first character string obtained by the OCR. Alternatively, a method of designating a position used as a file name, or a method of selecting text information at a specific position of an image as a file name may be used. The method of designating text information obtained by the OCR as a file name has been explained. Also, a method of designating text information obtained by the OCR as Subject of e-mail may be similarly realized.

On the other hand, if it is determined in step S403 that the OCR sending field is set to be "OFF", the flow advances to step S406 to create a multi-page TIFF file on the basis of an image scanned by the scanner 134. Furthermore, the TIFF file is encoded by BASE64 to create e-mail data in step S407. The created e-mail data is sent by SMTP in step S408, and the sending result is written in a log in step S409, thus ending the process in the Email sending mode.

Note that the result written in the log can be printed as a sending result report and communication management report. Also, the result can be displayed on the console 133 to confirm the sending result.

As can be seen from the above description, according to the communication apparatus of this embodiment, upon embedding text information extracted by applying an OCR into a text of e-mail, the type of character code of the extracted text information is detected (on the basis of an operator's instruction or automatically). The detected type of character code and an identifier that indicates a description range of the text information to be embedded are described in the text of e-mail to clearly specify them to the receiver side, thus avoiding occurrence of garble.

That is, the receiver side can display the extracted text information of that described in the text of the received e-mail message using the Korean character codes, and can display the input text information using Japanese character codes. As a result, occurrence of garble can be avoided.

Second Embodiment

In the first embodiment, the communication apparatus which creates e-mail by embedding, into a text of e-mail, text information, which is extracted by applying an OCR to a document scanned using the scanner, has been explained. However, a communication apparatus according to the present invention is not limited to this.

In this embodiment, a communication apparatus for creating a notification e-mail message to be sent in a system which stores a received e-mail message in a mail box, and in which the communication apparatus creates a notification e-mail message using text information of a text of the received e-mail message, and text information used to notify the receiver that the e-mail message is stored in the mail box (text information appended by the communication apparatus), and sends the created notification e-mail message to the receiver will be explained.

<Data Transfer Function Setting Window of MFP>

Figure 7:
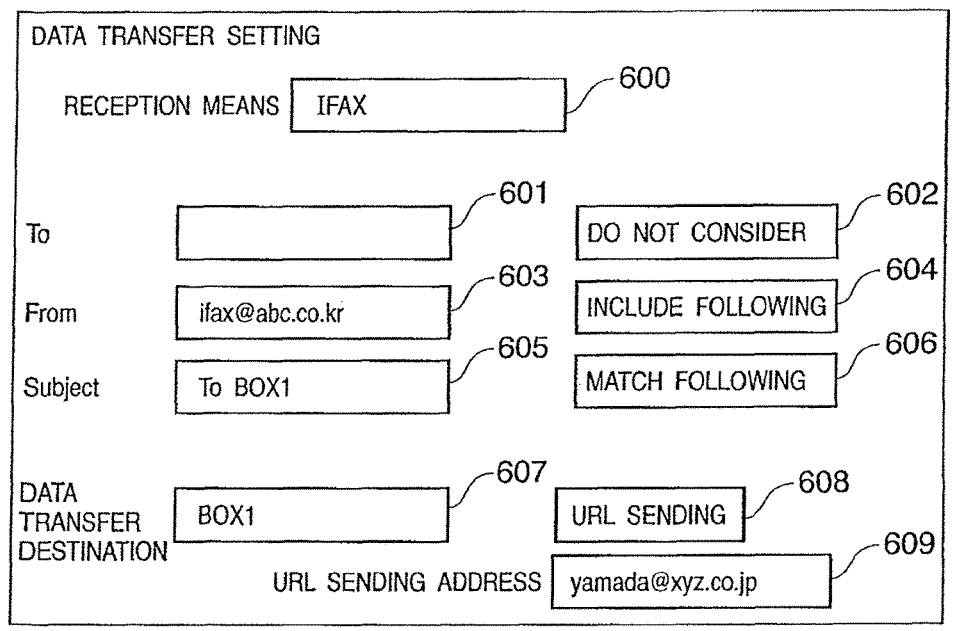
FIG. 7 is a view for explaining a data transfer setting function of the communication apparatus.

FIG. 7 shows a setting window used to set a data transfer function of externally transferring IFAX/FAX-received e-mail data, or storing the e-mail in a mail box in the communication apparatus (MFP 100) according to the second embodiment of the present invention.

A receiving means input field 600 is used to designate receiving means. The user can select either FAX or IFAX. In this embodiment, the operation executed when IFAX is set as the receiving means will be explained.

When the receiving means input field 600 is IFAX, a transfer destination is determined by comparing To, From, and Subject described in the received e-mail message with character strings set in a To input field 601, From input field 603, and Subject input field 605.

The comparison method includes seven choices: "do not consider", "include following", "match following", "not match following", "starting from following", "end with following", and "exclude following". If conditions are matched, the received e-mail is transferred to the designation designated in a transfer destination input field 607. A maximum of 150 transfer destinations can be set, and a print process is executed if all the transfer conditions are not matched.

In the transfer destination input field 607, the address book and mail boxes 1 to 50 present in the SMTP server/

POP server 103 can be set. When a destination in the address book is set, the destination is designated by selecting a category from FAX, Email, and IFAX.

When one of mail boxes 1 to 50 is selected in the transfer destination input field 607, a URL sending button 608 is allowed to select. When an address is selected from another address book, the URL sending button 608 is displayed by hatching, and cannot be selected.

When one of mail boxes 1 to 50 is selected in the transfer destination input field 607, and the URL sending button 608 is selected, an input to a URL sending destination input field 609 is allowed.

The URL sending destination input field 609 can be selected from destinations registered in an e-mail category of the address book. Upon reception of IFAX, the MFP 100 stores an IFAX reception document in one of mail boxes 1 to 50, and sends a notification e-mail message that describes a URL indicating the storage location to the destination set in the URL sending destination input field 609.

<Flow of Data Transfer Process in MFP>

Figure 8:
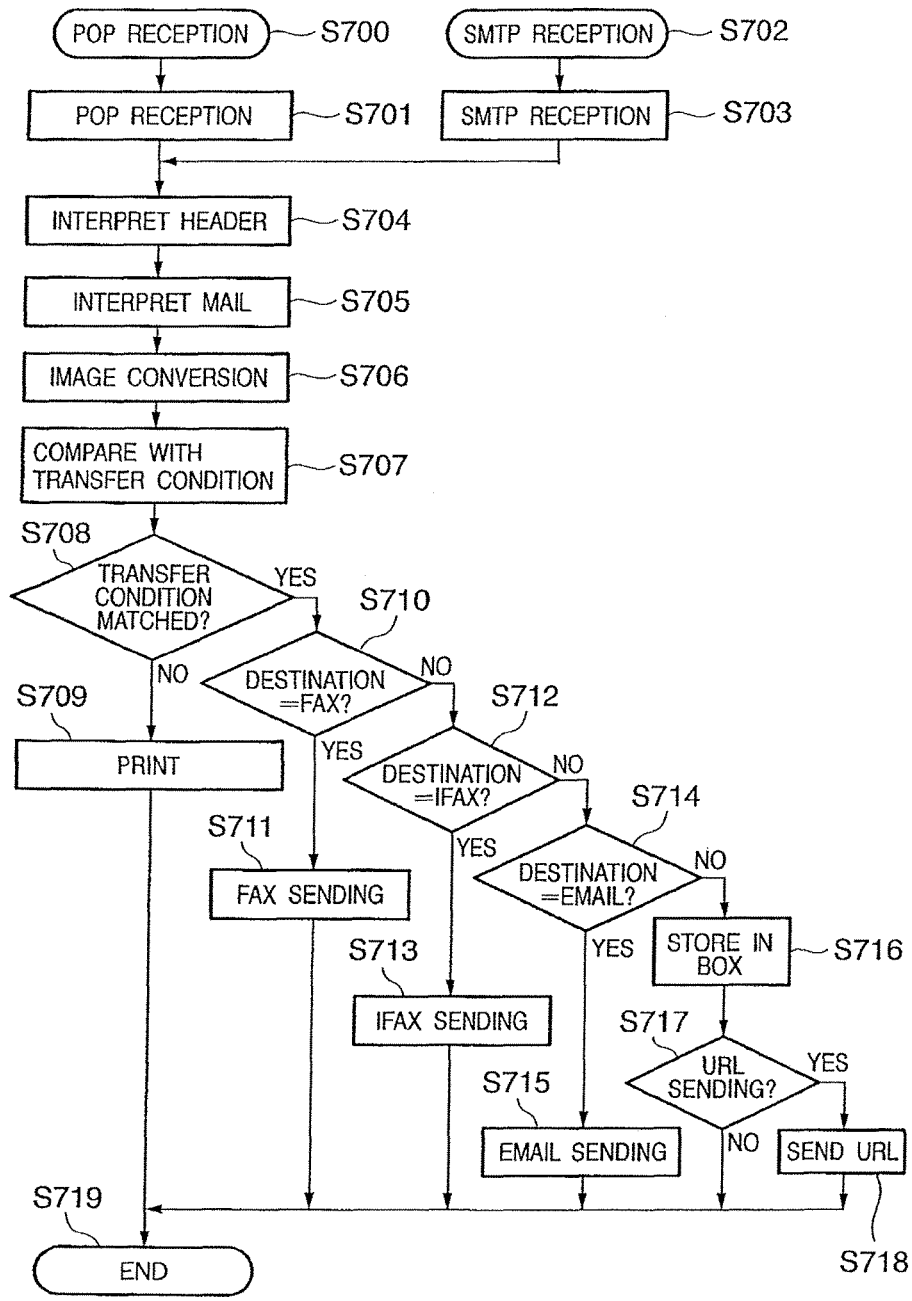
FIG. 8 is a flowchart showing the flow of a data transfer process of the communication apparatus.

FIG. 8 is a flowchart showing the flow of the processes in the MFP executed when an image received by the POP or SMTP reception function is to be transferred by the data transfer function, and its URL is to be sent.

In step S700, a POP reception process is launched. The POP reception process is periodically launched at POP reception intervals set in the user mode.

In step S701, in order to confirm if received mail messages are stored in the POP server 103 set in the user mode, the POP server 103 is accessed according to the POP3 protocol. If e-mail data are found, they are acquired from the POP server 103 according to the POP3 protocol (POP reception process).

In step S702, an SMTP reception process is launched. The SMTP reception process is launched when e-mail is delivered from the SMTP server 120. In step S703, e-mail data is acquired according to the SMTP protocol.

In step S704, a header (corresponding to the fields 500 to 507 in FIG. 6) of the e-mail data received by POP or SMTP is interpreted to acquire To, From, Subject information, and the like of the e-mail data.

In step S705, the e-mail data is interpreted. More specifically, MINE data is interpreted to check the data configuration of the e-mail data. If it is determined as a result of interpretation that the e-mail data of interest is a TIFF image file, an image conversion process is executed in step S706.

In step S706, the image conversion process for BASE64-decoding the e-mail data if that e-mail data is encoded by BASE64 or applying uuencode if the e-mail data is uuencoded is executed. With this process, text data of the e-mail data is converted into binary data.

If the image size of the acquired TIFF file is an A4 image at 200 dpi, which is specified by RFC2301, it is confirmed if the number of main scan pixels is 1,728. If the number of main scan pixels is not 1,728, the main scan pixels are centered to 1,728 pixels. Furthermore, in case of an image that causes a decode error, a process for removing error pixels is also executed.

Upon completion of the image conversion process in step S706, the acquired e-mail data is compared with the data transfer conditions in step S707. More specifically, the data transfer conditions described using FIG. 7 are compared with To, From, and Subject obtained by the header interpretation process in step S704 to examine if the data transfer conditions are matched. If the data transfer conditions are not matched, a print process in step S709 is executed, thus ending the process in step S719.

On the other hand, if the data transfer conditions are matched, the flow advances to step S710 to check if the data transfer destination is FAX. If the data transfer destination is a FAX address, the flow advances to step S711 to execute a FAX sending process. Furthermore, it is checked in step S712 if the sending destination is IFAX. If the sending destination is IFAX, the flow advances to step S713 to execute an IFAX sending process.

Likewise, it is checked in step S714 if the sending destination is an Email address. If the sending destination is an Email address, the flow advances to step S715 to execute an Email sending process; otherwise, a storage process in a mail box is executed in step S716.

It is checked in step S717 if the URL sending button 608 is set ON when the e-mail data is stored in the mail box. If the URL sending button 608 is set ON, a URL sending process is executed in step S718.

Upon executing the URL sending process in step S718, a notification e-mail message is created using the text of the received e-mail data, and text information used to notify the client PC 104 that e-mail is stored in a mail box. When the notification e-mail message is to be created, text information included in the text of the received e-mail data, the type of character code of the text information, and an identifier indicating the description range of that text information are described in the text of the notification e-mail message. The created notification e-mail message is sent to the URL sending destination, thus ending the reception transfer process. Note that the kind of language of the notification message can be arbitrarily selected by the operator.

<Example of URL-Sent E-Mail>

FIG. 9 shows an example of notification e-mail data used to notify yamada@xyz.co.jp (client PC 104) that e-mail data is stored in a mail box by the URL sending function, i.e., notification e-mail data to be sent by the URL sending process in step S718, when e-mail data sent from ifax@abc.co.kr of Korea is received by copy1.xyz.co.jp, and the received e-mail data is stored in a mail box of the POP server 103 by the data transfer setting in copy1.xyz.co.jp.

A field 800 indicates that the priority of this e-mail is highest, and a field 801 includes a date of sending the notification e-mail by the URL sending process.

A From field 802 is set with the e-mail address ifax@copy1.xyz.co.jp of copy1.xyz.co.jp, a Subject field 803 is set with "URL Message", and a To field 804 is set with yamada@xyz.co.jp that receives the notification e-mail message.

A MIME Content-type field 807 indicates that the notification e-mail message includes a plurality of parts, and a delimitation character string is "boundary". A field 809 stores that delimiter.

A field 810 indicates that the notification e-mail data is text information, and its character set uses Japanese JIS code of ISO-2022-JP, and a field 811 indicates that 7-bit data is consequently stored. Fields 813 to 819 store that text information, and the following contents are converted into JIS codes.

813 sender: ifax@abc.co.kr
814 sending date: Wed, 31 Dec. 2003 17:10:54 +0900
815 subject: To BOX1
817 Data is stored in Box number 1
818 You can refer to images at the following URL
819 http://copy3.canon.co.jp/frame.cgi?FuncType=BOX&Dummy=1077503290427

A field 821 stores delimiter data of mail, and indicates that text information written in Japanese ends, and new mail data follows. A field 822 indicates that the new mail data is also text information, and its character set is Korean, i.e., ISO-2022-KR. A field 823 indicates that 7-bit data is consequently stored.

A field 825 describes text information of the text of the source e-mail sent from ifax@abc.co.kr of Korea to copy1.xzy.co.jp, i.e., a Korean message with the contents "I'll send attached document", which is encoded by ISO-2022-KR.

A field 827 stores data indicating the end of delimitation of the e-mail data, and indicates that the Korean message ends and no data follows.

When yamada@xyz.co.jp receives this notification e-mail by launching mail software installed in the client PC 104, he or she can detect that image data from ifax@abc.co.kr of Korea is stored in the mail box of copy1.xzy.co.jp. When the user clicks a URL, browser software installed in the client PC 104 is launched, and an image can be displayed on the client PC 104.

Also, the Korean message "I'll send attached document" sent from ifax@abc.co.kr can be confirmed on the mail software.

As can be seen from the above description, according to the communication apparatus of this embodiment, upon creating a notification e-mail message, text information in the text of the received e-mail, the type of character code of the text information, and an identifier that indicates a description range of the extracted text information are described in the text of the notification e-mail to clearly specify them to the receiver side, thus avoiding occurrence of garble.

That is, the receiver side can display the extracted text information of that described in the text of the received e-mail message using the Korean character codes, and can display the attached text information using Japanese character codes. As a result, occurrence of garble can be avoided.

Other Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function expansion board or a function expansion unit, which is inserted in or connected to the computer, after the program code read out from the storage medium is written in a memory of the expansion board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-224581 filed on Jul. 30, 2004, the entire contents of which are hereby incorporated by reference herein.

The invention claimed is:

1. A communication apparatus which is capable of receiving an e-mail as Internet FAX, comprising:
   a display;
   a network interface;
   a controller, including a memory which stores instructions and a processor which executes the instructions, the controller being configured to execute the following:
     receive, via a user interface displayed on the display, settings for an e-mail received as the Internet FAX, wherein the settings include a predetermined storage destination, conditions and a transmission destination;
     store image data attached to a received first e-mail in the predetermined storage destination according to the conditions included in the settings received via the user interface;
     acquire first character codes included as text in the received first e-mail and first classification information which indicates an encoding type of the first character codes; and
     generate, in a case where the image data attached to the first e-mail is stored in the predetermined storage destination included in the settings received via the user interface, a second e-mail having a multipart format including a first part and a second part; and
     transmit, using the network interface, the generated second e-mail to the transmission destination included in the settings received via the user interface,
   wherein, in the first part of the transmitted second e-mail, second character codes corresponding to notification information for notifying that the image data attached to the first e-mail has been stored in the predetermined storage destination and second classification information which indicates an encoding type of the second character codes are described, the encoding type of the second character codes corresponding to a language used by the communication apparatus,
   wherein, in the second part of the transmitted second e-mail, the acquired first classification information and the acquired first character codes are described, and
   wherein, if another received e-mail does not satisfy the conditions included in the settings received via the user interface, image data attached to the received e-mail is not stored in the predetermined storage destination and the second e-mail is not generated.

2. The communication apparatus according to claim 1, wherein a part of the second character codes corresponds to URL information for accessing the predetermined storage destination.

3. The communication apparatus according to claim 1, wherein the acquired first classification information is described in a header area of the second part, and the acquired first character codes are described in a text area of the second part.

4. The communication apparatus according to claim 1, wherein the second classification information is described in a header area of the first part, and the second character codes are described in a text area of the first part.

5. The communication apparatus according to claim 1, further comprising a printer,
wherein, if another received e-mail does not satisfy the conditions included in the settings received via the user interface, the image data attached to the received e-mail is printed by the printer without generating the second e-mail based on the received e-mail.

6. The communication apparatus according to claim 1, wherein, if a setting of a transmission of the notification information is disabled in the conditions included in the settings received via the user interface, the second e-mail is not transmitted in accordance with storing the image data attached to the first e-mail.

7. The control method according to claim 1, wherein the second classification information is described in a header area of the first part, and the second character codes are described in a text area of the first part.

8. A control method for controlling a communication apparatus which is capable of receiving an e-mail as Internet FAX, the communication apparatus comprising a display, a network interface, and a controller, including a memory which stores instructions and a processor which executes the instructions to perform the method, the method comprising steps of:
receiving, via a user interface displayed on the display, settings for an e-mail received as the Internet FAX, wherein the settings include a predetermined storage destination, conditions and a transmission destination;
storing image data attached to a received first e-mail in the predetermined storage destination according to the conditions included in the settings received via the user interface;
acquiring first character codes included as text in the received first e-mail and first classification information which indicates an encoding type of the first character codes;
generating, in a case where the image data attached to the first e-mail is stored in the predetermined storage destination included in the settings received via the user interface, a second e-mail having a multipart format including a first part and a second part; and
transmitting, using the network interface, the generated second e-mail to the transmission destination included in the settings receives via the user interface,
wherein, in the first part of the transmitted second e-mail, second character codes corresponding to notification information for notifying that the image data attached to the first e-mail has been stored in the predetermined storage destination and second classification information which indicates an encoding type of the second character codes are described, where the encoding type of the second character codes corresponds to a language used by the communication apparatus,
wherein, in the second part of the transmitted second e-mail, the acquired first classification information and the acquired first character codes are described, and
wherein, if another received e-mail does not satisfy the conditions included in the settings received via the user interface, image data attached to the received e-mail is not stored in the predetermined storage destination and the second e-mail is not generated.

9. The control method according to claim 8, wherein a part of the second character codes corresponds to URL information for accessing the predetermined storage destination.

10. The control method according to claim 8, wherein the acquired first classification information is described in a header area of the second part, and the acquired first character codes are described in a text area of the second part.

11. The control method according to claim 8, wherein the communication apparatus further comprises a printer,
wherein, if another received e-mail does not satisfy the conditions included in the settings received via the user interface, the image data attached to the received e-mail is printed by the printer without generating the second e-mail based on the received e-mail.

12. The control method according to claim 8, wherein, if a setting of a transmission of the notification information is disabled in the conditions included in the settings received via the user interface, the second e-mail is not transmitted in accordance with storing the image data attached to the first e-mail.

13. A non-transitory computer readable storage medium storing a program for causing a computer to execute a control method for controlling a communication apparatus which is capable of receiving an e-mail as Internet FAX, the communication apparatus comprising a display, a network interface, and a controller, including a memory which stores the computer program and a processor which executes the program, the program comprising:
code for a receiving step of receiving, via a user interface displayed on the display, settings for an e-mail received as the internet FAX, wherein the settings include a predetermined storage destination, conditions and a transmission destination;
code for a storing step of storing image data attached to the received first e-mail in the predetermined storage destination according to the conditions included in the settings received via the user interface;
code for an acquiring step of acquiring first character codes included as text in the received first e-mail and first classification information which indicates an encoding type of the first character codes;
code for a generating step of, generating, in a case where the image data attached to the first e-mail is stored in the predetermined storage destination included in the settings received via the user interface, a second e-mail having a multipart format including a first part and a second part; and
code for a transmission step of transmitting, using the network interface, the generated second e-mail to the transmission destination included in the settings received via the user interface,
wherein, in the first part of the transmitted second e-mail, second character codes corresponding to notification information for notifying that the image data attached to the first e-mail has been stored in the predetermined storage destination and second classification information, which indicates an encoding type of the second character codes are described, where the encoding type of the second character codes corresponds to a language used by the communication apparatus, wherein, in the second part of the transmitted second e-mail, the acquired first classification information and the acquired first character codes are described, and wherein, if another received e-mail does not satisfy the conditions included in the settings received via the user interface, image data attached to the received e-mail is not stored in the predetermined storage destination and the second e-mail is not generated.

* * * * *